United States Patent
Haas et al.

(10) Patent No.: US 11,821,514 B2
(45) Date of Patent: Nov. 21, 2023

(54) PARKING LOCK, TRANSMISSION, AND DRIVE INSTALLATION

(71) Applicant: Valeo Siemens eAutomotive Germany GmbH, Erlangen (DE)

(72) Inventors: Bernd Haas, Erlangen (DE); Patrick Seemann, Erlangen (DE); Runtian Yin, Erlangen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/454,875

(22) Filed: Nov. 15, 2021

(65) Prior Publication Data

US 2022/0154823 A1 May 19, 2022

(30) Foreign Application Priority Data

Nov. 17, 2020 (DE) ...................... 10 2020 214 420.6

(51) Int. Cl.
*F16H 63/34* (2006.01)
*F16H 63/38* (2006.01)

(52) U.S. Cl.
CPC ..... *F16H 63/3433* (2013.01); *F16H 63/3466* (2013.01); *F16H 63/38* (2013.01)

(58) Field of Classification Search
CPC ............. F16H 63/3425; F16H 63/3433; F16H 63/3466; F16H 63/38
See application file for complete search history.

(56) References Cited

U.S. PATENT DOCUMENTS

| 6,725,962 B1 * | 4/2004 | Fukuda ................. F16D 63/006 |
| | | 192/219.5 |
| 2009/0038430 A1 * | 2/2009 | Itazu ................... F16H 63/3458 |
| | | 74/503 |

(Continued)

FOREIGN PATENT DOCUMENTS

| CN | 102135176 A | 7/2011 |
| CN | 104019227 A | 9/2014 |

(Continued)

OTHER PUBLICATIONS

European Search Report issued in European Application No. 21208332.3, dated Feb. 4, 2022 (4 pages).

(Continued)

*Primary Examiner* — Lori Wu
(74) *Attorney, Agent, or Firm* — Osha Bergman Watanabe & Burton LLP

(57) ABSTRACT

Parking lock (1, 19, 24) for a motor vehicle, having a movable locking means for impinging a parking lock wheel (14), disposed in the interior of a transmission housing (2), with a holding force, wherein the movable locking means, by means of a shifting shaft (3) that is rotatable by a drive motor (4) and a cam (7) that is coupled to the shifting shaft (3) is pivotable between a releasing state, in which the parking lock wheel (14) is rotatable, and a blocked state, in which a rotation of the parking lock wheel (14) is blocked, wherein the drive motor (4) is disposed outside the transmission housing (2), the shifting shaft (3) penetrates the transmission housing (2), and the cam (7) is disposed within the transmission housing (2). The invention moreover relates to a transmission having a parking lock (1, 19, 24) of this type, and to a drive installation for electrically drivable motor vehicle.

10 Claims, 3 Drawing Sheets

(56) References Cited

U.S. PATENT DOCUMENTS

2011/0005891 A1* 1/2011 Hongawara ......... F16H 63/3416
192/219.4
2020/0166133 A1* 5/2020 Morise .................. F16H 25/186

FOREIGN PATENT DOCUMENTS

| CN | 108317247 A | 7/2018 |
|---|---|---|
| CN | 110425277 A | 11/2019 |
| CN | 111720539 A | 9/2020 |
| CN | 111810631 A | 10/2020 |
| DE | 102014117731 A1 | 6/2015 |
| EP | 3527857 A1 | 8/2019 |
| JP | 2019006195 A * | 1/2019 |
| WO | 2017/216230 A1 | 12/2017 |
| WO | 2019-167993 A1 | 9/2019 |
| WO | WO-2019167993 A1 * | 9/2019 |

OTHER PUBLICATIONS

Office Action in corresponding European Application No. 21 208 332.3, dated Nov. 21, 2022 (9 pages).

\* cited by examiner

PARKING LOCK, TRANSMISSION, AND DRIVE INSTALLATION

BACKGROUND

The invention relates to a parking lock for a motor vehicle, having a movable locking means for impinging a parking lock wheel, disposed in the interior of a transmission housing, with a holding force.

Parking locks, which are also referred to as parking brakes, are increasingly used in motor vehicles. A movable locking means here acts on a parking lock wheel which by way of transmission components is connected to a wheel of the motor vehicle. In the blocked state, the parking lock blocks the wheel of the motor vehicle.

In the parking lock of the generic type described in document WO 2017/216230 A1, a tappet and the drive of the latter are disposed within a transmission housing. The tappet interacts with a unilaterally mounted lever which has a protrusion, the latter as a result of an activation of the tappet, being able to be pivoted into a recess of a parking lock wheel.

A construction of this type is however complex. A separate wire harness is in each case required for the interior of the transmission housing as well as for the external side. Moreover, it has to be prevented that transmission oil enters the parking brake, in particular the electric drive of the latter, as a result of pressure differentials between the interior of the transmission housing and the parking brake. A design embodiment of this type however results in an increased complexity in terms of construction.

SUMMARY

The invention is based on the object of specifying a parking lock for a motor vehicle that is of simple construction while ensuring a reliable performance. In order for this object to be achieved, it is provided according to the invention in a parking lock of the type mentioned at the outset that the movable locking means, by means of a shifting shaft that is rotatable by a drive motor and a cam that is coupled to the shifting shaft is pivotable between a releasing state, in which the parking lock wheel is rotatable, and a blocked state, in which a rotation of the parking lock wheel is blocked, wherein the drive motor is disposed outside the transmission housing, the shifting shaft penetrates the transmission housing, and the cam is disposed within the transmission housing.

The invention is based on the concept that the drive of the parking lock, in particular an electric drive, can be particularly reliably protected against the ingress of transmission oil in that the drive motor is disposed outside the transmission housing. The shifting shaft driven by the drive motor extends inward through the transmission housing and supports the pivotable cam. As a result, only a single wire harness which is disposed outside the transmission housing is required. Separate ventilation of the parking lock is not required. The parking lock according to the invention is thus of simple construction and guarantees a reliable performance.

A refinement of the invention provides that the shifting shaft is surrounded by a torsion spring which is fastened to the shifting shaft, on the one hand, and to the cam, on the other hand. The torsion spring moves the cam that blocks the parking lock wheel when the shifting shaft is pivoted from the releasing state to the blocked state.

The torque is transmitted from the shifting shaft to the cam via the torsion spring when the parking lock is moved from the non-braked, inactive position, i.e. the releasing state, to the braked position, i.e. the blocked state. The cam, as a result of a rotation of the shifting shaft in a (first) rotating direction by the torsion spring, can thus be transferred from the releasing state to the blocked state.

In the context of the invention it is preferable for a detent to be disposed on the shifting shaft. The detent enables the cam, by a rotation of the shifting shaft in the direction opposite to the rotating direction, is able to be transferred from the blocked state to the releasing state.

In the context of the invention it can be provided that the cam has a passage opening that is adapted to the external diameter of the shifting shaft. The cam is thus configured so as to be separate from the shifting shaft and rotatable at least about portions of the shifting shaft. The cam and the shifting shaft are coupled to one another by way of the torsion spring.

In order for an operation of the parking lock according to the invention with particularly little friction to be guaranteed, it can be provided that the shifting shaft is mounted on or in the transmission housing by a friction bearing or a roller bearing. The mounting of the shifting shaft has the effect of reducing the friction and consequently a reduced required output of the electric drive.

One design embodiment of the invention provides that the shifting shaft in relation to the transmission housing is sealed by a sealing element. The sealing element prevents the ingress of contamination into the interior of the transmission housing, while the leakage of transmission oil through the transmission housing to the outside is prevented at the same time.

The parking lock according to the invention can apply a particularly high holding force when the shifting shaft is mounted in the transmission housing by way of the free end of said shifting shaft that is opposite the drive motor. The free end of the shifting shaft is preferably mounted in a blind bore of the transmission housing or of a transmission cover by way of a roller bearing or a friction bearing. The free end of the shifting shaft can also be provided with a spacer sleeve, as a result of which the shifting shaft is positioned in the axial direction.

The invention also relates to a transmission having a parking lock of the type described.

The invention moreover also relates to a drive installation for an electrically drivable motor vehicle, comprising an electric machine, a transmission coupled to the electric machine, and a parking lock of the type described.

BRIEF DESCRIPTION OF DRAWINGS

The invention will be explained in more detail hereunder by means of exemplary embodiments with reference to the drawings. The drawings are schematic illustrations in which.

DETAILED DESCRIPTION

Figure 1:
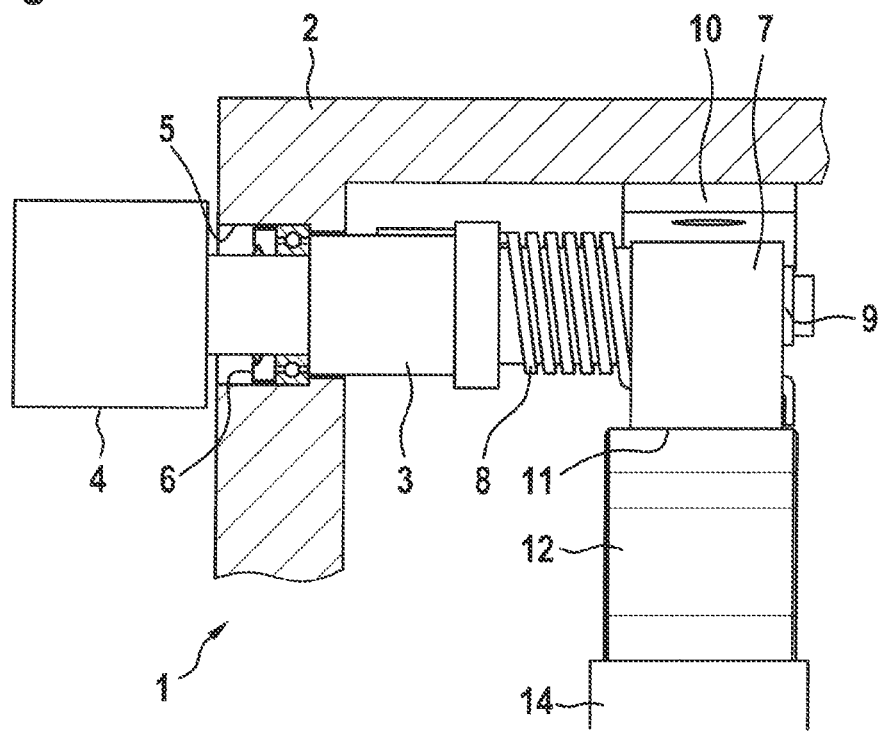
FIG. 1 shows the substantial components of a parking lock according to the invention in a transmission housing.

FIG. 1 shows a parking lock 1 which is disposed in a transmission housing 2. The parking lock 1 comprises a shifting shaft 3 which is rotatable by an electric drive motor 4. To this end, the shifting shaft 3 is coupled to a drive shaft of the drive motor 4. It can be seen in FIG. 1 that the electric drive motor 4 is disposed outside the transmission housing 2, the latter being illustrated in a sectional view. The shifting shaft 3 penetrates an opening 5 of the transmission housing 2. Besides the part that is directly adjacent to the electric drive motor 4, the largest part of the shifting shaft 3 is disposed within the transmission housing 2. The opening 5 is sealed by a sealing element 6. The sealing element 6 seals an annular space between the opening 5 of the transmission housing 2 and the external side of the shifting shaft 3.

A cam 7 is disposed on the shifting shaft 3, wherein the shifting shaft 3 and the cam 7 are configured as separate components. The cam 7 has a passage opening that is adapted to the external diameter of the shifting shaft 3 so that the cam 7 can be pushed onto the end portion of the shifting shaft 3. The shifting shaft 3 is surrounded by a torsion spring 8. One end of the torsion spring 8 (the left end in FIG. 1) is supported on the shifting shaft 3 and is fastened to the shifting shaft 3. The opposite end of the torsion spring 8 (the right end in FIG. 1) is supported on the cam 7 and is fastened to the cam 7. The shifting shaft 3 in the region of the free end thereof has a disk 9 that fixes the cam 7 in the axial direction.

Figure 2:
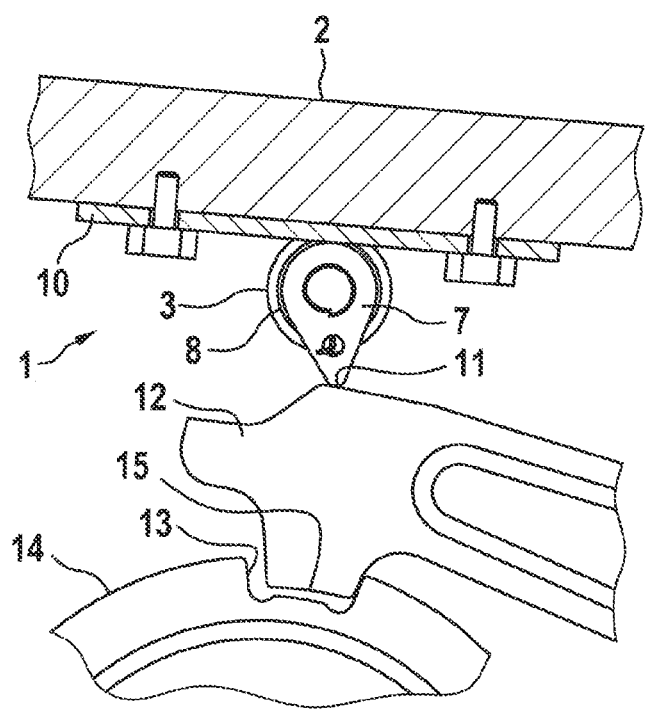
FIG. 2 shows an axial view of the parking lock with a blocked parking lock wheel.

FIG. 2 shows the parking lock 1 in an axial view, i.e. in the longitudinal direction of the shifting shaft 3. A plate 10, produced from a steel alloy, is situated on the internal side of the transmission housing 2. The plate 10 is disposed between the cam 7 and the internal side of the transmission housing 2 and lies opposite the cam 7. When the cam 7 rotates the latter contacts the plate 10, i.e. the cam 7 rolls on the plate 10 but does not contact the transmission housing 2.

FIG. 2 shows the cam 7, approximately in the maximum "deployed" position of said cam 7, in which the tip of the cam 7 is situated at its lowest position. The cam 7 by way of the tip 11 thereof contacts a movable locking means which is configured as a blocking latch. One end (not illustrated) of the blocking latch 12 is pivotally mounted. The blocking latch 12 in the proximity of the free end thereof has a transversely projecting protrusion 15. When the cam 7 pivots the blocking latch 12, the protrusion 15 of the blocking latch 12, counter to the force of a spring (not shown), is moved into a recess 13 of a parking lock wheel 14. The protrusion 15 of the blocking latch 12 in this state blocks a rotation of the parking lock wheel 14, the latter being coupled to a wheel of the motor vehicle by way of a transmission. The parking lock 1 in the blocked state shown in FIG. 2 prevents a rotation of the wheel of the motor vehicle. A control installation (not shown) serves for controlling the electric drive motor 4 by way of which the shifting shaft 3 and consequently the cam 7 are driven.

Figure 3:
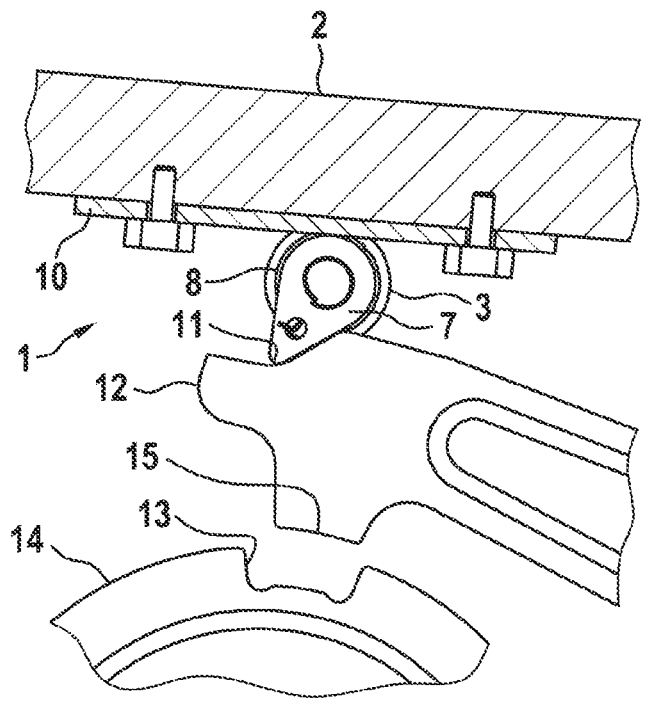
FIG. 3 shows the parking lock shown in FIG. 2 in the releasing state.

FIG. 3 is a view similar to that of FIG. 2 and shows the parking lock 1 in an axial view, once the cam 7, proceeding from the position shown in FIG. 1, has been rotated in the clockwise manner. The tip 11 of the cam 7 here slides along the external side of the blocking latch 12. As a result, the blocking latch 12, under the effect of the spring acting on the blocking latch 12, is moved away from the parking lock wheel 14 in the direction of the cam 7. In this state, the protrusion 15 of the blocking latch 12 is situated outside the recess 13 of the parking lock wheel 14 so that a rotation of the parking lock wheel 14 is no longer blocked. Accordingly, the wheel of the motor vehicle that is coupled to the parking lock wheel 14 can then be moved.

FIG. 3 thus shows the parking lock 1 in the non-active state (releasing state), while FIG. 2 shows the parking lock 1 in the blocked state in which a rotation of the parking lock wheel 14 is blocked. Proceeding from the state shown in FIG. 3, the cam 7 can be transferred from the releasing state to the blocked state by rotating the shifting shaft 3 in the anti-clockwise manner. The shifting shaft 3 here transmits the torque to the cam 7 via the torsion spring 8.

Should the protrusion 15 of the blocking latch 12 here not be situated above a recess 13 of the parking lock wheel 14, the protrusion cannot be moved into the recess, instead bearing on the external circumference of the parking lock wheel 1. The torque transmitted by the shifting shaft 3 then has the effect that the torsion spring 8 is tensioned, i.e. potential energy is stored in the torsion spring 8. The parking lock wheel 14 rotates when the vehicle in which the parking lock is disposed continues to roll. The blocking latch 12, under the effect of the pre-tensioning force generated by the torsion spring 8, is then pushed into the next recess 13 so that the parking lock 1 is situated in the blocked state.

Figure 4:
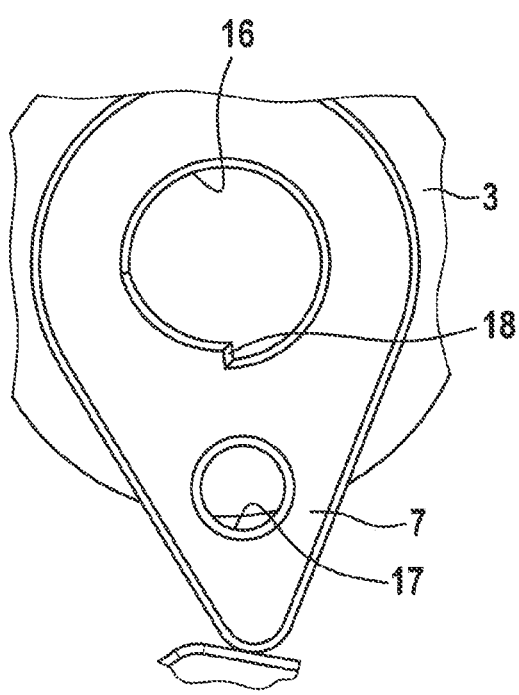
FIG. 4 shows an enlarged view of the cam disposed on the shifting shaft, when viewed in the longitudinal direction of the shifting shaft.

FIG. 4 shows an axial view of the cam 7, the latter being situated on the shifting shaft 3. It can be seen that the cam 7 possesses a passage opening 16 that is adapted to the external diameter of the shifting shaft 3 in this region. The torsion spring 8 can be hooked into a second, smaller passage opening 17 of the cam 7. It can be seen in FIG. 4 that the cam 7 has a detent 18 so that the cam 7 in the rotation of the shifting shaft 3 in the clockwise manner is transferred directly, i.e. without any participation of the torsion spring 8, from the blocked state to the releasing state.

Figure 5:
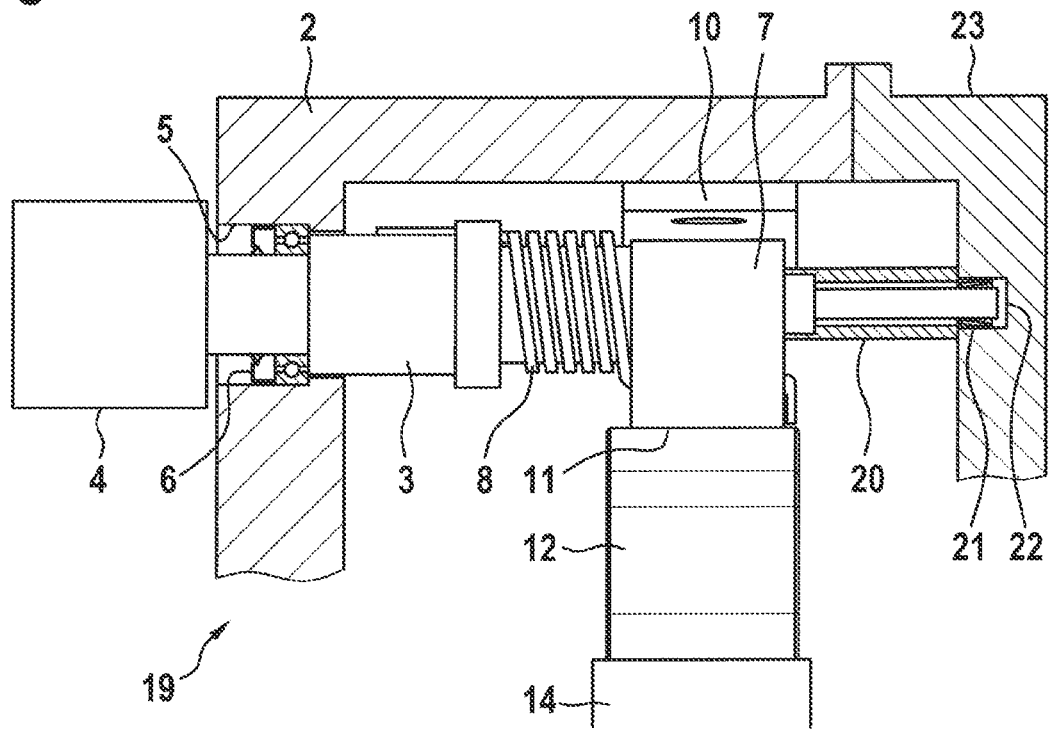
FIG. 5 shows an axial view of a further exemplary embodiment of a parking lock according to the invention.

FIG. 5 shows a partially sectional view of a second exemplary embodiment of a parking lock 19, wherein identical components are identified by identical reference signs. The parking lock 19, in a manner identical to that of the first exemplary embodiment, comprises the shifting shaft 3 that partially penetrates the transmission housing 2 and is largely received in the transmission housing 2 The shifting shaft 3 is driven by the electric drive motor 4. The cam 7 that is coupled to the shifting shaft 3 serves for blocking the blocking latch 12 of the parking lock wheel 14. A spacer sleeve 20 which by means of a bearing 21 is mounted in a blind bore 22 of a transmission housing cover 23 is disposed on the right end of the shifting shaft 3 in FIG. 5. As a result of this support on the end of the shifting shaft 3 that is opposite the drive, said shifting shaft 3 can transmit a higher torque.

Figure 6:
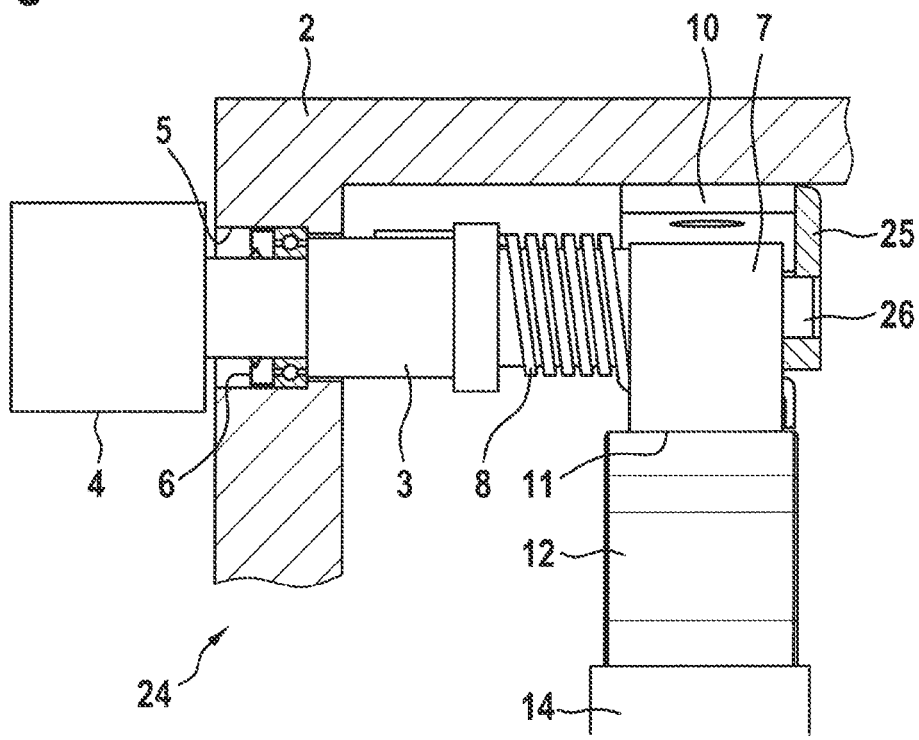
FIG. 6 shows an axial view of a further exemplary embodiment of a parking lock according to the invention.

FIG. 6 shows a third exemplary embodiment of a parking lock 24, wherein identical components are again provided with the same reference signs as in the preceding exemplary embodiments. The shifting shaft 3 that is received in the transmission housing 2, at the free end of said shifting shaft 3, i.e. the right end in FIG. 6, is mounted in a plate 25 which is disposed so as to be perpendicular to the longitudinal direction of the shifting shaft 3. The plate 25 is fastened to the plate 10, the latter being situated on the internal side of the transmission housing 2, and has a circular opening in which an end portion 26 of the shifting shaft 3 is inserted and mounted. As a result of this support, the shifting shaft 3 is capable of transmitting a higher torque.

The invention claimed is:

1. A parking lock for a motor vehicle, comprising:
a movable locking means for impinging a parking lock wheel, disposed in an interior of a transmission housing, with a holding force,
wherein the movable locking means, by means of a shifting shaft that is rotatable by a drive motor and a cam coupled to the shifting shaft and configured to be rotatable at least about portions of the shifting shaft, is pivotable between a releasing state, in which the parking lock wheel is rotatable, and a blocked state, in which a rotation of the parking lock wheel is blocked,
wherein the cam, by means of a detent disposed on the shifting shaft, and by rotation of the shifting shaft in a direction opposite to a rotating direction, is configured to be transferred from the blocked state to the releasing state,
wherein the drive motor is disposed outside the transmission housing, the shifting shaft penetrates the transmission housing, and the cam is disposed within the transmission housing,
wherein the shifting shaft is surrounded by a torsion spring which is fastened to the shifting shaft and to the cam, and
wherein a plate is disposed between the cam and an interior side of the transmission housing, such that as the cam rotates, the cam contacts the plate.

2. The parking lock according to claim 1, wherein the cam, as a result of a rotation of the shifting shaft in the rotating direction by the torsion spring, is able to be transferred from the releasing state to the blocked state.

3. The parking lock according to claim 1, wherein the cam in the blocked state impinges a blocking latch of the movable locking means and pushes the blocking latch into a recess of the parking lock wheel.

4. The parking lock according to claim 3, wherein during transfer into the blocked state when the blocking latch cannot be moved into the recess of the parking lock wheel, a torque transmitted by the shifting shaft is stored as potential energy in the torsion spring, wherein the blocking latch in a further rotation of the parking lock wheel is pushed into the recess of the parking lock wheel.

5. The parking lock according to claim 1, wherein the cam has a passage opening that is adapted to an external diameter of the shifting shaft.

6. The parking lock according to claim 1, wherein the shifting shaft is mounted on or in the transmission housing by a friction bearing or a roller bearing.

7. The parking lock according to claim 1, wherein the shifting shaft in relation to the transmission housing is sealed by a sealing element.

8. The parking lock according to claim 1, wherein the shifting shaft is mounted in the transmission housing by way of a free end of the shifting shaft that is opposite the drive motor.

9. A transmission, comprising a parking lock according to claim 1.

10. A drive installation for an electrically drivable motor vehicle, comprising:
an electric machine;
a transmission coupled to the electric machine; and
a parking lock according to claim 1.

* * * * *